United States Patent
Rosenthal

[11] Patent Number: 6,030,653
[45] Date of Patent: Feb. 29, 2000

[54] INACTIVATION OF IRON DEPENDENT BACTERIUM USING VISIBLE AND NEAR INFRARED LIGHT

[76] Inventor: Richard A. Rosenthal, 2680 Pacer La., San Jose, Calif. 95111

[21] Appl. No.: 09/185,290

[22] Filed: Nov. 3, 1998

[51] Int. Cl.[7] .................................................. A61L 2/00
[52] U.S. Cl. ........................ 426/248; 422/24; 426/238; 99/451; 99/483
[58] Field of Search ................................ 426/248, 238, 426/521; 422/24; 99/483, 451

[56] References Cited

U.S. PATENT DOCUMENTS

| | | | |
|---|---|---|---|
| 5,034,235 | 7/1991 | Dunn et al. | 426/238 |
| 5,489,442 | 2/1996 | Dunn et al. | 426/248 |
| 5,597,597 | 1/1997 | Newman | 426/248 |
| 5,900,211 | 5/1999 | Dunn et al. | 422/24 |

Primary Examiner—N. Bhat
Attorney, Agent, or Firm—Walter A. Hackler

[57] ABSTRACT

An apparatus and process are provided for cold pasteurizing a food product such as a ground beef food product, using visible and near infrared light. The invention includes radiating the food product with pulsed near infrared light having a wavelength capable of penetrating the food product to at least about one centimeter in depth and further, radiating nonionizing radiation into the food product to inactivate bacterium, particularly iron dependent bacterium, therein. The nonionizing radiation preferably includes visible and near infrared wavelengths, with ultraviolet wavelengths filtered therefrom. The invention may further include using a pulsed heat exchanger to supercool the food product during the pulsed radiation treatment.

19 Claims, 1 Drawing Sheet

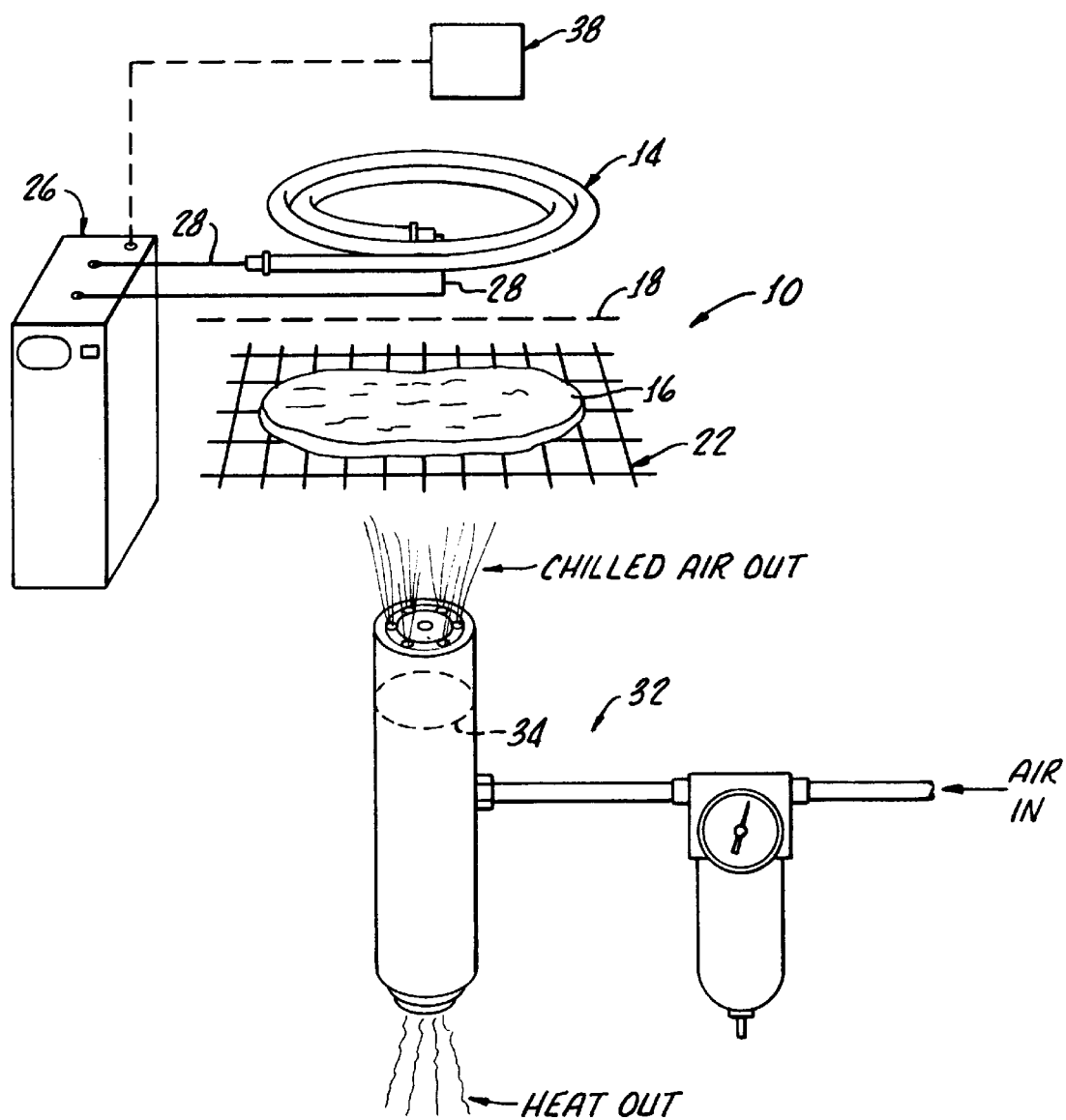

INACTIVATION OF IRON DEPENDENT BACTERIUM USING VISIBLE AND NEAR INFRARED LIGHT

The present invention generally relates to apparatus for cold pasteurization of food products and more specifically relates to apparatus and method for inactivating iron dependent bacterium such as *E. coli* and salmonella in the interior of a food product, such as ground beef, through the use of visible and near infrared radiation.

Sanitation of foods for safe human consumption is becoming an increasingly urgent concern as new, more resilient strains of food borne pathogens have been proliferating. For example, a bacterial organism known as *E. coli* is ordinarily a benign organism found in the intestines of animals, and on the exterior of plants. However, *E. coli* has the ability to mutate into strains that are highly toxic if ingested. A recently discovered and particularly dangerous strain of the bacteria, called *E. coli* 0157:H7, has been implicated in numerous disease outbreaks, as many as thirty each year across the United States during the past five years. People have been infected and hospitalized as a result of eating contaminated beef, cheese and fresh fruits. Unfortunately, many experts believe that the problem is on the rise. As epidemiologists search for answers on how to discover sources of contamination during an epidemic, and as doctors search for new effective treatments, it is believed that prevention and controlling the spread of these pathogens is still the best way to protect the public health.

Treatment of food products using high frequency radiation is considered "cold pasteurization" because it theoretically will not cause significant heating of the food being treated. Cold pasteurization uses nonionizing wavelengths of light. This is to be contrasted with sanitation processes that use ionizing radiation such as gamma, E-beam or X-ray radiation, which cause permanent denaturation of essential proteins and enzymes and permanent degradation of the organoleptic properties of the food product.

Irradiation processing using the actinic effects of ultraviolet light has been studied as a possible tool for sterilizing food products by exposing food products, such as bakery items to ultraviolet light at germicidal wavelengths, typically being wavelengths shorter than 300 nanometers. Unfortunately, undesirable superficial effects result from ultraviolet radiation processing of foods, including the development of oxidative flavors and aromas and a change in surface texture.

Not surprisingly, attempts have been made to develop apparatus and methods for utilizing the germicidal effect of ultraviolet light while minimizing the damaging effects of such treatments. For example, U.S. Pat. No. 5,034,235 to Dunn et al, which is incorporated herein by this specific reference thereto, discloses the application of pulsed, incoherent, polychromatic light in the visible, near ultraviolet and far ultraviolet wavebands to food products. The Dunn patent describes the use of pulsed light, rather than a continuous light as a means for causing thermal and/or photochemical deactivation of microorganisms without substantially altering the organoleptic qualities of a food product. It is suggested that by pulsing the light, the heating effect of the light is concentrated to only a thin, superficial layer of the food product. Dunn also suggests that by use of appropriate filters, certain wavelengths which may be responsible for causing adverse effects on food quality, could be minimized during the pulsed light treatment, thus allowing only beneficial light to contact the food product surface.

U.S. patent application Ser. No. 09/002,067 for An Actinic Process and Apparatus for Cold Pasteurization of Fresh Foods and Beverages, which is incorporated herein by this specific reference thereto, discloses an apparatus and process for sanitizing fresh foods and beverage products using multiple stages of exposure to different wavelengths of ultraviolet and infrared light in order to eliminate undesirable microorganisms without altering the nutritional or organoleptic qualities of the product.

It is known that certain food products are particularly susceptible to dangerous levels of contamination. For example, although a beef steak is generally considered safe to consume when cooked "rare", a hamburger patty is not because bacteria, such as *E. coli*, may have contaminated the beef before it was ground, thus infecting the patty throughout. It would therefor be beneficial to inactivate bacteria, particularly iron dependent bacteria, beneath the surface of a raw food product.

The present invention represents an advancement over earlier developments in the field of cold pasteurization by utilizing the germicidal effects of light, particularly visible and near infrared light, to inactivate pathogens not only at a surface of the food product, but at a significant depth beneath the surface. Furthermore, the present invention provides a process for targeting iron dependent bacteria, such as *E. coli* and salmonella, in meat products.

SUMMARY OF THE INVENTION

Accordingly, the present invention provides a process for pasteurizing an interior of a food product using nonionizing radiation and more specifically provides a process for inactivating iron dependent bacteria in meat products. Generally, a process in accordance with the invention comprises the steps of radiating a surface of a food product, such as a ground beef patty, with wavelengths of light capable of penetrating the food product in order to create an "optical window" therein, in other words, such a wavelength being the minimal effective wavelength at which animal tissue becomes transmissive. For example, near infrared light at a wavelength of about 600 nm is radiated onto ground beef to create such an optical window. This wavelength of light affords acceptable penetration and adsorption to a depth of about 1.0 cm into oxygenated tissue. Preferably, the process includes the step of pulsing the near infrared light in order to more effectively penetrate cellular tissue of the food product.

The ability of the pulsed discharge, for example at about 600 nm, to penetrate cellular tissue permits the microbial inactivation of bacterium in the interior of the food product without utilizing ionizing radiation, such as gamma, E-beam or X-ray. More particularly, in conjunction with the creation of an optical window, the process includes the step of inactivating pathogens within the optical window by radiating nonionizing radiation onto the food product. Preferably, the nonionizing radiation comprises visible and near infrared wavelengths of light. Moreover, the step of inactivating pathogens may include using specific wavelengths of light capable of inactivating iron dependent photomediated enzymatic bacterium, such as *E. coli* and salmonella, by causing a reaction that inhibits assimilation of iron by the bacterium.

Acting in concert with this reaction is a thermal shock wave which destroys heat sensitive bacteria, such as toxic *E. coli* 0157:H7. By radiating a pulsed high energy discharge at a peak wavelength of 600 nm onto the food product, the temperature of the food product may be raised about 20 degrees centigrade, which is sufficient to rupture bacterial DNA. In conjunction with the pulsed high energy discharge treatment, the the food product may be supercooled, preferably using a pulsed heat exchanger, on a falling edge of each high energy pulse to prevent thermal damage to the food product.

Optionally, the process may include the step of filtering the nonionizing radiation to prevent exposure of the food product to damaging wavelengths of ultraviolet light. Alternatively, the process may include the step of photoreactivating the food product, to restore organoleptic qualities lost due to UV radiation from a previous UV treatment cycle. Photoreactivation may be accomplished by exposing the irradiated food product to certain wavelengths of polychromatic visible and near infrared light which cause reversal of the damaging effects of UV radiation.

Cold pasteurization apparatus in accordance with the present invention generally comprises means for radiating a surface of a food product with near infrared light capable of penetrating the food product surface in order to create an optical window therein, and means for radiating the food product with nonionizing actinic radiation in order to inactivate pathogens at the surface of the food product within the optical window. Both of these means may be provided by a suitable lamp, for example an ultra high intensity xenon lamp, and a power supply for powering the lamp.

Filter means for preventing harmful UV radiation onto the food product may optionally be provided. Alternatively, means for photoreactivating the food product using polychromatic near infrared light may be included for reversing any UV damage. In addition, the apparatus may include a heat exchanger for supercooling the food product during the radiation treatment.

BRIEF DESCRIPTION OF THE DRAWING

The present invention will be more clearly understood with reference to the following detailed description and the accompanying drawing of which:

FIG. 1 shows apparatus suitable for performing a process, in accordance with the invention, for inactivation of iron dependent bacterium beneath a surface of a food product, using visible and near infrared light.

DETAILED DESCRIPTION

A process or method for cold pasteurizing a food product using visible and near infrared light, in accordance with the invention generally comprises the steps of radiating a surface of a food product, with near infrared light to create an "optical window", i.e. the minimal effective wavelength at which animal tissue becomes transmissive. More specifically, in order to create an optical window into a meat product, such as a ground beef patty, light at a minimum wavelength of about 600 nm is radiated onto the surface of the ground beef patty. Radiation of the near infrared light onto ground beef affords acceptable penetration and adsorption to a depth of at least about one centimeter at a maximum energy of 199 kJ per mole (2.06 eV).

Preferably, the process includes the step of pulsing the near infrared light in order to more effectively penetrate cellular tissue of the food product. For example, the near infrared light may be pulsed at a pulse duration of about 250 μs, a pulse delay of about 17 ms, and a pulse repetition rate of 60 times per second.

The ability of the pulsed discharge at about 600 nm to penetrate cellular tissue permits the microbial inactivation of bacterium in the interior of the food product without utilizing ionizing radiation, such as gamma, E-beam or X-ray. More particularly, in conjunction with the creation of an optical window using the pulsed near infrared radiation, the process includes the step of inactivating pathogens within the optical window by radiating other wavelengths of nonionizing radiation onto the food product. For example, near infrared, infrared, visible and ultraviolet light at the surface of the optical window may be used to eliminate pathogens within the optical window. It is known that ultraviolet light at certain wavelengths may also be used to inactivate undesirable microorganisms on the surface of the food products. However, ultraviolet radiation is known to cause degradation to the organoleptic qualities of the food product, although, as disclosed in the incorporated U.S. patent application Ser. No. 09/002,067, the effects are largely reversible by employing photoreactivation to the UV treated product.

More preferably therefor, the nonionizing radiation comprises visible and near infrared light. It will now be described how light in the near infrared and visible wavebands may be used to target iron dependent bacterium in the food product. More particularly, the step of inactivating pathogens may include using specific wavelengths of light capable of inactivating bacterium, such as $E.\ coli$ and salmonella, by causing, a photomediated enzymatic reaction that inhibits assimilation of iron by the bacterium.

It is known that the ability of invasive pathogens to replicate in host tissues is dependent upon the availability of iron. Iron effects the susceptibility of the host organism, or food substrate, by reducing the lethal dose of bacteria by a factor of 100,000 times. The importance of iron lies in its strictly limited availability in living, respiring tissues; therefore, the amount of iron available to invading pathogens is extremely limited. Typically, iron is acquired by a pathogen from the hemoglobin in the host's tissues (ferritin) or from free heme (transferrin). This iron is obtained by four significant mechanisms: 1) proteolytic cleavage of the iron-binding protein that results in the disruption of iron-binding properties of the molecule and the release of iron, 2) reduction of the $Fe^{3+}$ (ferric/insoluble) protein complex to a $Fe^{2+}$ (ferrous/soluble) protein complex with the consequent release of iron, 3) a direct interaction between specific transferrin, or lactoferrin specific receptors on the bacterial cell surface and the $Fe^{3+}$ (ferric/insoluble/inactive) protein complex, and 4) by the production of low molecular weight ferric chelating compounds (siderophores) that remove iron from the $Fe^{3+}$ protein complex and deliver it to the bacterial cell via specific ferric siderophore receptors.

Under conditions of iron restriction in vitro, $E.\ coli$ and salmonella produce the catecholate iron chelator enterobactin. This compound is the cyclic triester of 2,3-dihydroxy-N-benzoyl-L-serine which is synthesized only under conditions of iron restriction. It efficiently removes iron from the iron binding proteins and delivers it into the bacterial cell. Enterobactin acts as a hexadentate chelating agent that binds iron through its three catechol groups, which when coordinating with ferric iron, acts as a six proton acid. At neutral pH the hexa-coordinate complex carries three negative charges {Fe(ent)}3−. Most of the genes involved in siderophore biosynthesis and transport are negatively regulated at the transcriptional level by a 17 k Da(Dalton) repressor protein, Fur(ferric uptake repressor) which uses ferrous (Fe2+) iron as a co-repressor.

Bacteria such as $E.\ coli$ and salmonella, are iron dependent in that their survival depends on the amount of iron available by means of the host tissue. The primary adsorption spectra for porphyrins (photoactive pigments), specifically heme iron is 465 nm and 600 nm, and 950 nm for the absorption spectra of bonded phenols that may be responsible for the post transcriptional modification, or photomediated response, of phenylalanine TRNA whereby a methylsulfide (CH3S) complex is present in an iron replete environment, and absent in an iron restrictive environment. By suppressing the presence of the CH3S complex in an iron replete environment via a photomediated response, the accumulation of Fe2+ (ferrous) iron becomes toxic to the iron dependent bacterial pathogens.

The step of inactivating pathogens preferably comprises radiating the surface with visible and near infrared light having wavelengths of about 465 nm, about 600 nm, and about 950 nm respectively. This step will trigger a photoreceptor response mechanism that turns off the ferric uptake repressor (Fur) which prevents aerobactin and specifically enterobactin from being synthesized, thereby inhibiting the assimilation of Fe2+/Fe3+ by the iron dependent bacterial pathogens.

It is believed that the transmembrane potential of the bacterial cell is critically altered subsequent to intensive visible/near infrared radiation by the transition of Fe2+ (ferrous) iron which is soluble and ferromagnetic to Fe3+ (ferric) iron which is insoluble and ferrimagnetic. This is thought to lead to the increased accumulation of $Fe_3O_4$ (magnetite) which is a mineral commonly found in magnetotactic bacteria such as E. coli and is ferrimagnetic. This accumulation of $Fe_3O_4$ is believed to decrease the cell rotation frequency which degenerates the metabolic health of the cell. It has been observed by researchers that when cell rotation frequency is 50% or less of normal rotation frequency, the cell is considered photodamaged.

Preliminary test results using an AC(alternating current) pulsed power supply coupled to a VHE (very high energy) Xenon flashlamp operated at a frequency of 120 Hertz was used to deliver a total intergrated dose of 10.56 $Jcm^{-2}$ to a 1 cm thick, 25 gram, rectangular test sample of ground beef, impregnated interiorly with a $1 \times 10^4$ CFU (colonies forming units) concentration of hemorrhagic E. coli (0157:H7). This resulted in a log 1.5 reduction as compared to a 25 gram control sample at a concentration of $6.3 \times 10^4$ CFU. The concentration of the irradiated test sample was $2.2 \times 10^3$ CFU.

In addition to inactivating pathogens by inhibiting the assimilation of iron as described above, heat may be used to even more effectively destroy heat sensitive bacteria. Particularly, a thermal shock wave, resultant from the pulsed high energy discharge, may be utilized to destroy most heat sensitive bacteria by rupturing the bacterium's DNA. E. coli 0157:H7 is extremely sensitive to heat with a maximum tolerance of approximately 35 degrees centigrade. The heme iron more selectively adsorbs this thermal radiation in preference to the surrounding tissue.

More particularly, the present invention may include the steps of pulsing the near infrared radiation to cause a high energy discharge of about 21 J/cm2 at one centimeter from the lamp surface at a peak wavelength of 600 nm. As a specific example, the required thermal energy to raise the temperature of a ground beef patty having a diameter of 10.16 cm (4 in.) and a depth of 0.64 cm (0.25 in) and weighing 100 grams (0.21 lbs) from 20 degrees centigrade to 40 degrees centigrade, is 100 g×0.84 cal g-1 oC-1 (specific heat of beef)×20 oC×4 J cal-1=6720 J per patty. One patty having a diameter of 10.16 cm has a surface area of about 325 cm2. Therefor, 6720 J/325 cm2=21 J per cm2, is required to raise the temperature of the beef patty about 20 degrees centigrade. In addition, by using a pulsed heat exchanger, the temperature of the food product may be supercooled, on a falling edge of each high energy pulse, to about −40 degrees Fahrenheit.

Turning now to FIG. 1, apparatus 10 in accordance with the present invention, suitable for performing a process as hereinabove described, is shown. The apparatus 10 may comprise means, for example an ultrahigh intensity discharge pulsed xenon lamp 14 constructed in a flat spiral configuration, for radiating a surface of a food product 16 with near infrared light to create an optical window in the food product 16. The lamp may also provide means for radiating the food product 16 with nonionizing radiation in order to inactivate pathogens within the optical window by generating visible/near infrared wavelengths respectively at about 465 nm about 600 nm and about 950 nm. For filtering out UV wavelengths, a filter 18 may be provided. The apparatus 10 includes a mesh screen 22, or the like, for supporting and exposing the food product 16 to the lamp 14.

The lamp 16 may be powered by any suitable power supply 26, for example a 45 KW capacitatively-coupled alternating current power supply. The lamp 14 is connected to the power supply 26 by suitable connectors 28. The lamp 14 and power supply are capable of generating a high energy pulse discharge as described hereinabove and having the desired wavelengths.

As will be known to those skilled in the art, the input energy (Eo) applied to an AC pulsed xenon lamp is storage capacitance (C)×voltage (V)2. The radient intensity (Io) in Joules per unit area (cm2) is Eo(watts)×pulse rate (Pr)× duration of time (seconds)/surface area of lamp (As)(cm2). Input energy for an AC pulsed Xenon lamp is: Eo(watts)/ pulse rate(Pr) 60 times per second. The radient intensity (Io) in Joules per unit area (cm2 is Eo/surface area of lamp (As)(cm2).

The lamp 14 may be operated, for example, at a pulse duration of 250 $\mu s$, a pulse delay of 17 ms and a pulse repetition rate of 60 times per second to generate a pulse discharge of 2.880 megawatts per flash for a total integrated dose of 21 J/cm2 at one centimeter from a surface of the lamp 14 at a peak wavelength of about 600 nm.

A pulsed Vortex tube heat exchanger 32, which will be known to those skilled in the art, may provide means for supercooling the product 16, for example to about −40 degrees Fahrenheit, on a falling edge of each high energy discharge. For maintaining sanitation of the food product 16, the heat exchanger 32 preferably includes a microbial filter 34.

Optionally, the present invention 10 may include photoreactivation means 38, such as described in the incorporated U.S. patent application Ser. No. 09/002,067, for photoreactivating the food product 16 after the cold pasteurization treatment, particularly if UV radiation has not been filtered out during the inactivation step.

Although there has been hereinabove described an apparatus and process for inactivation of iron dependent bacterium using visible and near infrared light, in accordance with the invention, for the purpose of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the appended claims.

What is claimed is:

1. A process for pasteurizing an interior of a food product using nonionizing radiation, the process comprising the steps of:

radiating a surface of a food product with near infrared light having a wavelength capable of penetrating the surface in order to create an optical window into the food product, said optical window having a depth of at least about one centimeter from said surface; and radiating the food product with nonionizing visible/near infrared radiation in order to inactivate pathogens within the optical window of the food product.

2. The process according to claim 1 wherein the step of radiating a surface with near infrared light comprises radiating the surface with near infrared light having a wavelength of about 600 nm.

3. The process according to claim 2 wherein the step of radiating a surface with near infrared light includes pulsing the near infrared light.

4. The process according to claim 3 further comprising the step of supercooling the surface during the step of pulsing the near infrared light.

5. The process according to claim 1 wherein the step of radiating the food product with nonionizing radiation comprises radiating the food product with visible and near infrared light.

6. The process according to claim 1 wherein the step of radiating the food product with nonionizing radiation is comprised of radiating the food product with light having wavelengths of about 465 nm, about 600 nm and about 950 nm.

7. The process according to claim 1 further comprising the step of restoring organoleptic qualities to the radiated food product by exposing the food product to polychromatic near infrared light having wavelengths of between about 350 nm to about 380 nm in the UVA waveband, about 450 nm in the Soret waveband, about 550 nm in the visible waveband and between about 660 nm and about 720 nm in the red waveband.

8. The process according to claim 1 wherein the step of radiating the food product with nonionizing visible/near infrared radiation includes alternately raising a temperature of the food product with the nonionizing radiation, and supercooling the food product with a heat exchanger in order to inactivate heat sensitive bacterium without causing thermal damage to the product.

9. A process for pasteurizing an interior of a food product using nonionizing radiation, the process comprising the steps of:

penetrating a food product with visible/near infrared light to a depth of at least about one centimeter from a surface of the food product; and inactivating pathogens in the food product by exposing the penetrated food product to nonionizing visible/near infrared radiation.

10. The process according to claim 9 wherein the step of penetrating a food product comprises radiating a surface of the food product with near infrared light having a wavelength of about 600 nm.

11. The process according to claim 10 wherein the step of radiating a surface of the food product includes pulsing the near infrared light.

12. The process according to claim 11 further comprising the step of supercooling the surface during the step of pulsing the near infrared light.

13. The process according to claim 9 wherein the step of inactivating pathogens comprises radiating the food product with visible and near infrared light.

14. The process according to claim 9 wherein the step of inactivating pathogens is comprised of radiating the food product with light having wavelengths of about 465 nm, about 600 nm and about 950 nm.

15. The process according to claim 9 further comprising the step of restoring organoleptic qualities to the radiated food product by exposing the food product to polychromatic visible/near infrared light having wavelengths of between about 350 nm to about 380 nm in the UVA waveband, about 450 nm in the Soret waveband, about 550 nm in the visible waveband and between about 660 nm and about 720 nm in the red waveband.

16. The process according to claim 9 wherein the step of inactivating pathogens includes alternately raising a temperature of the food product with the nonionizing radiation, and supercooling the food product with a heat exchanger in order to inactivate heat sensitive bacterium without causing thermal damage to the product.

17. Cold pasteurization apparatus comprising:

means for radiating a surface of a food product with near infrared light having a wavelength capable of penetrating the surface in order to create an optical window into the food product, said optical window having a depth of at least about one centimeter from said surface; and means for radiating the food product with nonionizing visible/near infrared radiation in order to inactivate pathogens within the optical window of the food product.

18. Cold pasteurization apparatus for inactivating iron dependent bacterium in a ground beef food product, said apparatus comprising:

ultrahigh intensity pulsed xenon lamp means for radiating a surface of a ground beef food product, said lamp means capable of generating a pulsed discharge having wavelengths for penetrating the surface to a depth of at least about one centimeter from a the surface and for causing inactivation of iron dependent bacterium therein;

means, including an AC capacitively coupled power supply connected to the lamp means, for powering the lamp means; and means, including a pulsed heat exchanger, for supercooling the food product on a falling edge of each said pulsed discharge.

19. The cold pasteurization apparatus according to claim 18 wherein the pulsed discharge wavelengths are about 465 nm, about 600 nm and about 950 nm.

* * * * *